United States Patent
Mizutani

[11] Patent Number: 5,218,880
[45] Date of Patent: Jun. 15, 1993

[54] JOINT FOR CONNECTING A TRANSMISSION TO A GEAR CONTROL MECHANISM

[75] Inventor: Masaki Mizutani, Zama, Japan

[73] Assignee: Nissan Motor Co., Ltd., Yokohama, Japan

[21] Appl. No.: 638,575

[22] Filed: Jan. 8, 1991

[30] Foreign Application Priority Data

Jan. 10, 1990 [JP] Japan .................................. 2-2773

[51] Int. Cl.$^5$ ..................... B60K 20/00; F16D 3/00
[52] U.S. Cl. ..................... 74/473 R; 403/58; 403/117; 403/228; 464/132
[58] Field of Search .............. 403/57, 58, 113, 117, 403/225, 228; 464/132, 134, 136; 74/473 R

[56] References Cited

U.S. PATENT DOCUMENTS

| | | | |
|---|---|---|---|
| 3,778,860 | 12/1973 | Thielen | 403/58 |
| 4,004,434 | 1/1977 | Raby | 464/136 X |
| 4,272,972 | 6/1981 | James | 464/134 X |
| 4,365,488 | 12/1982 | Mochida et al. | 403/57 X |
| 4,930,924 | 6/1990 | Hunt | 403/225 X |
| 4,955,741 | 9/1990 | Komeyama | 403/57 |
| 5,062,730 | 11/1991 | Tomii et al. | 403/57 |

FOREIGN PATENT DOCUMENTS

| | | | |
|---|---|---|---|
| 523871 | 4/1931 | Fed. Rep. of Germany | 403/228 |
| 3806522 | 9/1989 | Fed. Rep. of Germany | |
| 61-138720 | 8/1986 | Japan | |
| 2136532 | 9/1984 | United Kingdom | 464/134 |

*Primary Examiner*—Vinh T. Luong
*Attorney, Agent, or Firm*—Leydig, Voit & Mayer

[57] ABSTRACT

A joint is provided between a transmission operating member of a transmission and a control rod of a transmission gear control mechanism. The joint includes rigid stopper rings for rigidly stopping deformations of resilient deformable members in predetermined directions and thereby rigidly stopping movement of outer sleeves of an outer sleeve unit in the directions crossing joint pins at right angles. The stopper rings are fittingly interposed between the outer sleeves and channel-like end portions of the transmission operating member such that the transmission operating member and control rod are relatively less movable in the direction crossing their axial directions at right angles.

8 Claims, 2 Drawing Sheets

JOINT FOR CONNECTING A TRANSMISSION TO A GEAR CONTROL MECHANISM

BACKGROUND OF THE INVENTION

1. Field of the Invention

The present invention relates in general to a transmission gear control mechanism of the remote control type such as a gear control mechanism for a transaxle of a front engine-front drive vehicle and more particularly to a joint between a transmission and a gear control mechanism therefor of the remote control type.

2. Description of the Prior Art

An example of a prior art transmission gear control mechanism of the above described type, is disclosed in Japanese Utility Model Provisional Publication No. 61-138720 and also shown in FIGS. 4 and 5. In the figures, a support rod 10 is connected at an end to a transmission 12 and at the other end to a control lever bracket 14 which is in turn supported on a vehicle body 16. A control lever 18 is pivotally supported on the bracket 14 and connected through a control rod 20 to a striking rod or the like transmission operating member 22. A joint 24 is provided between the control rod 20 and the transmission operating member 22 for preventing or reducing the transfer of vibration from the transmission 12 to the control lever 18. The joint 24, as shown in detail in FIG. 5, consists of a connector 26 having a pair of channel-like portions 26a, 26b to which a hollow cylindrical end portion 20a of the control rod 20 and a hollow elliptic end portion 22a of the transmission operating member 22 are connected by means of joint pins 28, inner sleeves 30, and resilient rubber bushings 32, 34. The rubber bushings 32, 34 are formed with arcuated openings 32a, 34a such that the bushings 32, 34 effect a larger spring constant in case of deformation in the axial directions of the control rod 20 and transmission operating member 22 and a smaller spring constant in case of deformation in the direction crossing the axial directions of the control rod 20 and transmission operating member 22 at right angles.

A disadvantage of the prior art transmission gear control mechanism is that a loss of shift effort on the control lever 18 is liable to be caused, therefore the feel of the control lever 18 during operation is liable to be deteriorated. In the worst case an incomplete shift can result since the end portions 20a, 22a of the control rod 20 and transmission operating member 22 are respectively movable relative to the channel-like end portions 26a, 26b of the connector 26 in the axial directions of the joint pins 28, i.e., in certain directions crossing the axial directions of the control rod 20 and transmission operating member 22 at right angles, while causing deformations of the bushings 32, 34. Therefore the joint 24 cannot attain a sufficient structural rigidity.

Another disadvantage is that the bushings 32, 34 are difficult to install and liable to be disposed out of place in assembly. In particular, the portions to be interposed between the channel-like portions 26a, 26b of the connector 26 and the end portions 20a, 22a of the control rod 20 and transmission operating member 22 have such a difficulty, resulting in a deteriorated assembling efficiency and durability.

A further disadvantage is that the joint 24 cannot provide sufficient insulation since the bushings 32, 34 for use in such an arrangement cannot be sufficiently low in hardness or spring constant in order to retain their durability.

SUMMARY OF THE INVENTION

In accordance with the present invention, there is provided a novel and improved joint between a transmission and its gear control mechanism.

The joint comprises a pair of rigid joint members integral with a transmission operating member of the transmission and a control rod of the transmission gear control mechanism, respectively, resilient deformable means interposed between the joint members for resiliently deforming in a predetermined direction and thereby allowing axial movement of one of the transmission operating member and the control rod relative to the other, stopper means for rigidly stopping deformation of the resilient deformable means in the predetermined direction when the deformation exceeds a predetermined amount and thereby rigidly stopping the axial movement of one of the transmission operating member and the control rod relative to the other.

The above structure is effective for solving the above noted problems inherent in the prior art device.

It is accordingly an object of the present invention to provide a novel and improved joint between a transmission and its gear control mechanism, which can effect an assured and reliable transmission gear control and at the same time can efficiently prevent or reduce the transfer of vibration from the transmission to the transmission gear control mechanism.

It is another object of the present invention to provide a novel and improved joint of the above described character which can attain an excellent operation feel of a control lever.

It is a further object of the present invention to provide a novel and improved joint of the above of resilient deformable members employed therein notwithstanding the fact that the resilient deformable members have lower spring constants than before.

DETAILED DESCRIPTION OF THE PREFERRED EMBODIMENT

Figure 1:
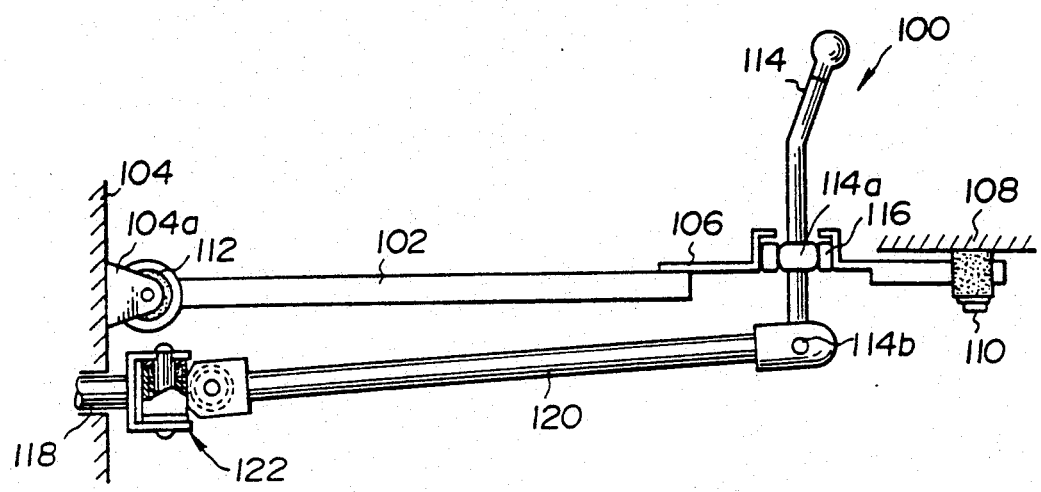
FIG. 1 is a schematic, partly sectional view of a transmission gear control mechanism incorporating a joint according to an embodiment of the present invention.
Figure 2:
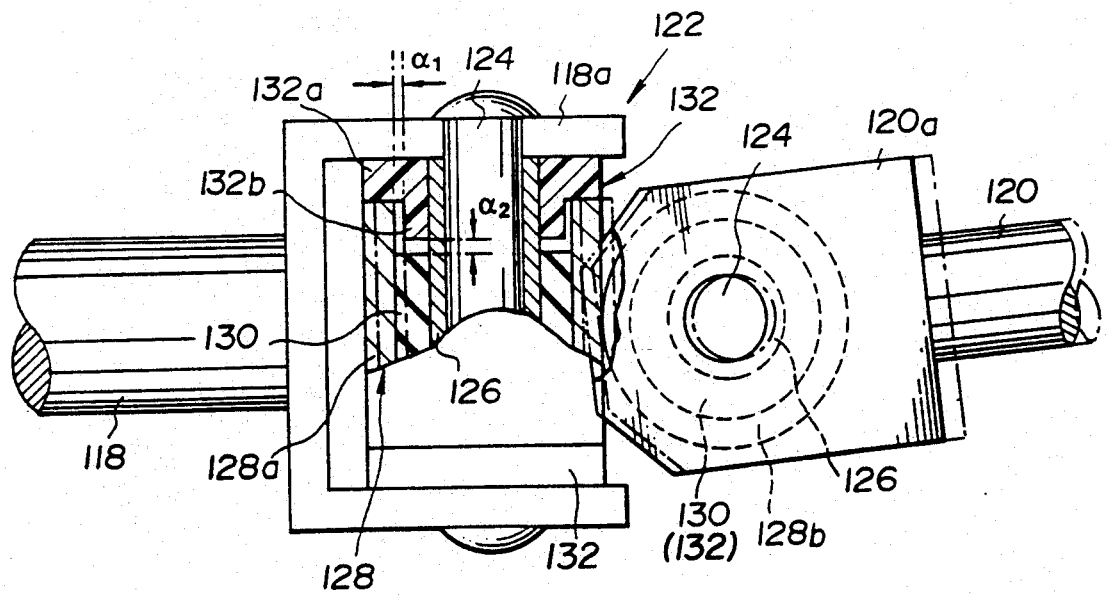
FIG. 2 is an enlarged, partly sectional view of the joint of FIG. 1.
Figure 3:
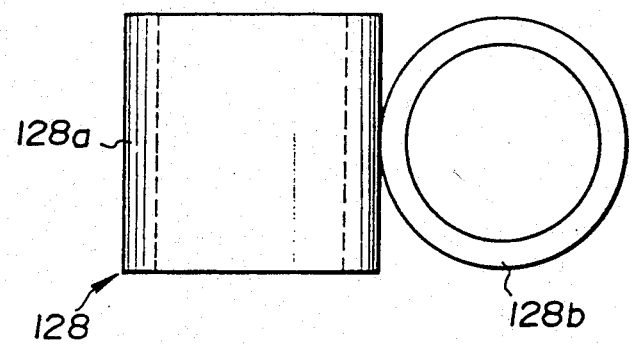
FIG. 3 is a perspective view of a one-piece outer sleeve unit or connector employed in the joint of FIG. 1.
Figure 4:
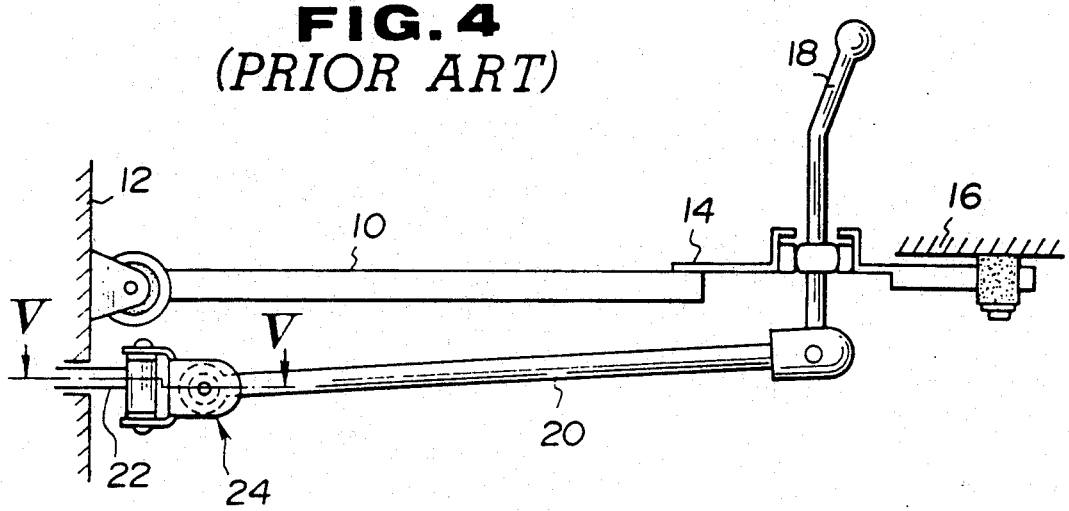
FIG. 4 is a view similar to FIG. 1 showing a transmission gear control mechanism with a prior art joint.
Figure 5:
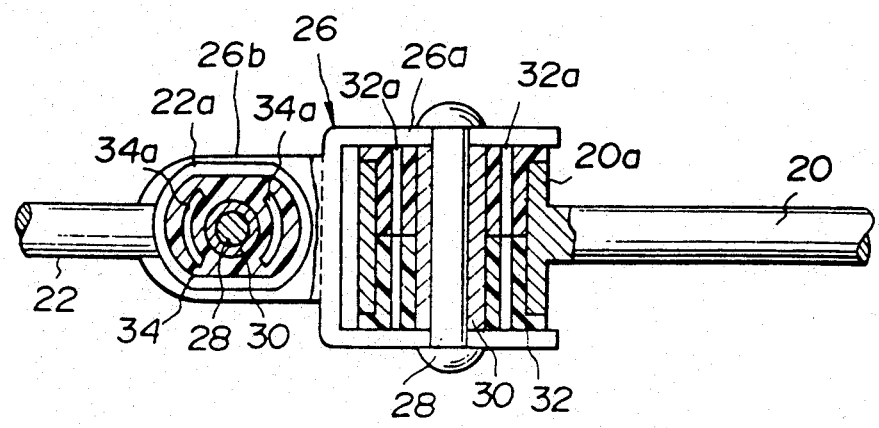
FIG. 5 is a sectional view taken along the line V—V of FIG. 4.

Referring to FIGS. 1 to 3, a transmission gear control mechanism of the remote control type is generally indicated by 100 and includes a support rod 102 connected at an end to a transaxle or transmission 104 and at the other end to a control lever bracket 106. The control lever bracket 106 is secured to a vehicle body 108 by way of an insulator or resilient deformable member 110. More specifically, the transmission 104 has a bracket 104a to which the support rod 102 is attached by way of an insulator or resilient deformable member 112.

A control lever 114 has a fulcrum portion 114a above a lower end portion 114b and is pivotally or swingably supported at the fulcrum portion 114a on the control lever bracket 106 by means of a bearing 116. The control lever 114 is operatively connected at the lower end portion 114b to the transmission 104, i.e., to a striking rod or other transmission operating member 118 by way of a control rod 120. More specifically, the control rod 120 is pivotally connected at an end to the lower end 114b of the control lever 114. A joint 122 is provided for connecting the other end of the control rod 120 to the transmission operating member 118.

As shown in an enlarged scale in FIG. 2, the transmission operating member 118 has an integral forked end portion or channel-like end portion 118a. Similarly, the control rod 120 has an integral forked end portion or channel-like end portion 120a. The channel-like end portions 118a, 120a are arranged to have parallel sides which oppose in the directions crossing each other at right angles. The channel-like end portions 118a, 120a constitute part of the joint 122. The joint 122 includes a pair of joint pins 124 extending between the parallel sides of the respective channel-like end portions 118a, 120a to cross each other at right angles, a pair of rigid inner sleeves 126 fittingly installed on the joint pins 124, a one-piece outer sleeve unit or connector 128 consisting of a pair of rigid outer sleeves 128a, 128b crossing each other at right angles and concentric with the respective joint pins 124, and a pair of insulators or tubular resilient deformable members 130 interposed between the inner sleeves 126 and the outer sleeves 128a, 128b.

The resilient deformable members 130 are shorter in axial length than the outer sleeves 128a, 128b. A pair of rigid stopper rings 132 are interposed between the outer sleeves 128a, 128b and the channel-like end portions 118a, 120a.

The stopper rings 132 are made of a synthetic resinous material and have a predetermined hardness. More specifically, the stopper rings 132 each have a stepped outer periphery, i.e., a larger diameter section 132a and a smaller diameter section 132b. The stopper rings 132 are fittingly installed on the inner sleeves 126, therefore on the joint pins 124 and fittingly interposed at the larger diameter sections 132a between the outer sleeves 128a, 128b and the channel-like end portions 118a, 120a of the transmission operating member 118 and control rod 120 to prevent movement of the outer sleeves 128a, 128b relative axially of the joint pins 124.

The smaller diameter sections 132b of the stopper rings 132 are arranged to protrude into the outer sleeves 128a, 128b, respectively. The smaller diameter sections 132b are smaller in diameter by a predetermined amount than the inner diameter of the outer sleeves 128a, 128b such that a predetermined clearance $\alpha_1$ is formed between the inner and outer peripheries of the outer sleeves 128a, 128b and the smaller diameter sections 132b of the stopper rings 132. As a result, the resilient deformable members 130 are deformable to a limited extent in predetermined directions for allowing the outer sleeves 128a, 128b to move by a limited amount relative to the joint pins 124 in the directions crossing the joint pins 124 at right angles. Namely, the resilient deformable members 130 are deformable for allowing axial movement of one of the transmission operating member 118 and control rod 120 relative to the other. In other words, the stopper rings 132 rigidly stop deformation of the resilient deformable members 130 in the directions crossing the joint pins 124 at right angles when the deformation exceeds a predetermined amount and thereby rigidly stop movement of the outer sleeves 128a, 128b in the corresponding directions. In this connection, it is to be noted that the outer sleeves 128a, 128b are not movable axially of the joint pins 124 such that the transmission operating member 118 and control rod 120 are relatively less movable in the direction crossing the axial directions thereof at right angles. A clearance $\alpha_2$ is provided between the axial ends of the stopper rings 132a, 132b and the resilient deformable members 130 in order to allow axial expansion of the resilient deformable members 130 upon radial contraction of same.

The resilient deformable members 130 have a spring constant which is sufficiently low that they are capable of damping or absorbing vibrations transmitted thereto from the transmission 104 efficiently.

With the foregoing structure, axial movement of one of the transmission operating member 118 and control rod 120 relative to the other is limited within a predetermined range of $2\alpha_1$, thus making it possible to reduce a loss of effort on the control lever 114 for shifting gears below a predetermined value and increase the structural rigidity in the axial direction of the control rod 120.

Further, relative movement of the transmission operating member 118 and control rod 120 in the direction crossing the axial directions thereof at right angles is limited within a predetermined range of $\alpha_1$, thus making it possible to reduce a loss of effort on the control lever 114 for selecting gears below a predetermined value and therefore improve the feel of the control lever 114 during operation. In this connection, it will be noted that vibrations of the control lever 114 are caused more by vibrations of the control rod 120 in the axial direction than by vibrations of the control rod 120 in the direction transverse to its axial direction.

What is claimed is:

1. A joint for connecting a transmission to a transmission gear control mechanism comprising:

a transmission operating member for connection to a transmission and having an end;

a control rod for connection to a transmission gear control mechanism and having an end;

first and second rigid end members integral with said end of said transmission operating member and said end of said control rod, respectively, and including channel-like portions connected to said transmission operating member and said control rod;

a connector interposed between said first and second end members and comprising an outer sleeve unit including a pair of outer sleeves crossing at right angles and integrally joined together;

a pair of joint pins connecting said connector to said rigid end members, each of said joint pins having an axis, said axes being disposed at right angles to each other;

resilient deformation means interposed between said first and second end members for resilient deformation in a predetermined direction in response to axial movement of said transmission operating member relative to said control rod and comprising a pair of resiliently deformable members interposed between said connector and said respective joint pins; and stopper means for rigidly stopping deformation of said resilient deformation means in the predetermined direction when the deformation exceeds a predetermined amount, thereby rigidly stopping the axial movement of said transmission operating member relative to said control rod and comprising a pair of rigid stopper rings interposed between said first and second end members and said connector, respectively, said rigid stopper rings having larger diameter sections and smaller diameter sections, said larger diameter sections being fittingly interposed between said connector and each of said first and second end members to prevent said connector and said first and second end members from moving toward and away from each other, said smaller diameter sections being separated from said connector by clearances around said smaller diameter sections for axial movement of said transmission operating member relative to said control rod, said larger diameter sections of said stopper rings being located between said channel-like portions of said end members and said outer sleeves, and said smaller diameter sections being received in said outer sleeves.

2. A joint as claimed in claim 1 wherein said resiliently deformable members and said stopper rings are axially separated from each other by clearances.

3. A joint as claimed in claim 2 comprising a pair of inner sleeves fittingly installed on said joint pins wherein said stopper rings are fittingly installed on said inner sleeves.

4. A joint for connecting a transmission to a transmission gear control mechanism comprising:
a transmission operating member for connection to a transmission and having an end;
a control rod for connection to a transmission gear control mechanism and having an end;
a first rigid end member connected to the end of the transmission operating member and a second rigid end member connected to the end of the control rod;
first and second joint pins connected to the first and second end members, respectively;
a rigid connector comprising a first sleeve having an axis and surrounding the first joint pin and a second sleeve rigidly connected to the first sleeve having an axis and surrounding the second joint pin, the axes of the first and second sleeves being disposed at right angles to each other;
a first resiliently deformable member disposed between the first joint pin and the first sleeve, and a second resiliently deformable member disposed between the second joint pin and the second sleeve; and
first and second stopper rings surrounding the first and second joint pins, respectively, each of the first and second stopper rings having a stopper portion disposed inside one of the first and second sleeves and separated from the respective sleeve by a gap.

5. A joint for connecting a transmission to a transmission gear control mechanism comprising:
first and second rods, each rod having an axis and an end;
a first rigid end member connected to the end of the first rod and a second rigid end member connected to the end of the second rod;
a rigid connector coupled to the first and second end members;
a resiliently deformable member disposed between the first end member and the connector resiliently deforming in response to relative movement of the connector and the first end member in the axial direction of the first rod; and
a rigid stopper disposed between the first end member and the connector and having a portion preventing relative movement of the first end member and the connector in the axial direction of the first rod beyond a predetermined movement.

6. A joint as claimed in claim 5 wherein the connector comprises first and second sleeves rigidly connected together, the first sleeve being disposed around the resiliently deformable member and the rigid stopper.

7. A joint as claimed in claim 6 wherein each of the first and second sleeves has an axis and the axes of the first and second sleeves are disposed at right angles to each other.

8. A joint as claimed in claim 6 wherein the portion of the rigid stopper for preventing relative movement has a periphery surrounded by the first sleeve for contacting the first sleeve when the relative movement reaches the predetermined movement.

* * * * *